Nov. 26, 1935.  H. HUEBER ET AL  2,022,643

BOOSTER PUMP FOR WINDSHIELD CLEANER SYSTEMS

Filed June 3, 1932

INVENTOR
Henry Hueber,
BY Erwin C. Horton,
Bean & Brooks. ATTORNEYS

Patented Nov. 26, 1935

2,022,643

UNITED STATES PATENT OFFICE 2,022,643

BOOSTER PUMP FOR WINDSHIELD CLEANER SYSTEMS

Henry Hueber, Buffalo, and Erwin C. Horton, Hamburg, N. Y., assignors to Trico Products Corporation, Buffalo, N. Y.

Application June 3, 1932, Serial No. 615,248

4 Claims. (Cl. 230—188)

This invention relates to fluid pumps and more particularly to double acting part-time pumps for use in the fluid pressure line of an automotive accessory.

An engine operated pump will supply fluid pressure in accordance with the speed of operation of the engine. Obviously, then, a greater supply of pressure may be furnished than the accessory will require or can accommodate.

Further, in the operation of automotive accessories by the use of a pressure differential between the pressure existing in the intake manifold of an internal combustion engine and atmospheric pressure, a variable operation of the accessory is often encountered due to the fluctuations of the pressure within the intake manifold, these fluctuations being caused by a sudden opening of the throttle, and therefore are most apparent during periods of acceleration. This variation or fluctuation of the suction in the intake manifold, produces a corresponding variation or fluctuation in the operation of the automotive accessory where the accessory is operated directly from the intake manifold. In many instances a fluctuating operating rate of the accessory is undesirable.

The object of the present invention is to provide a double acting pump adapted for part-time operation in maintaining a desired uniform and constant supply of operating pressure for the operation of the automotive accessory. The present invention further has for an object to provide a double acting part-time pump in the suction line between the accessory and the engine intake manifold to function more or less in supplementing the manifold supply of suction during those intervals of engine operation when the manifold supply is insufficient to operate the automotive accessory at the desired rate.

Figure 1:
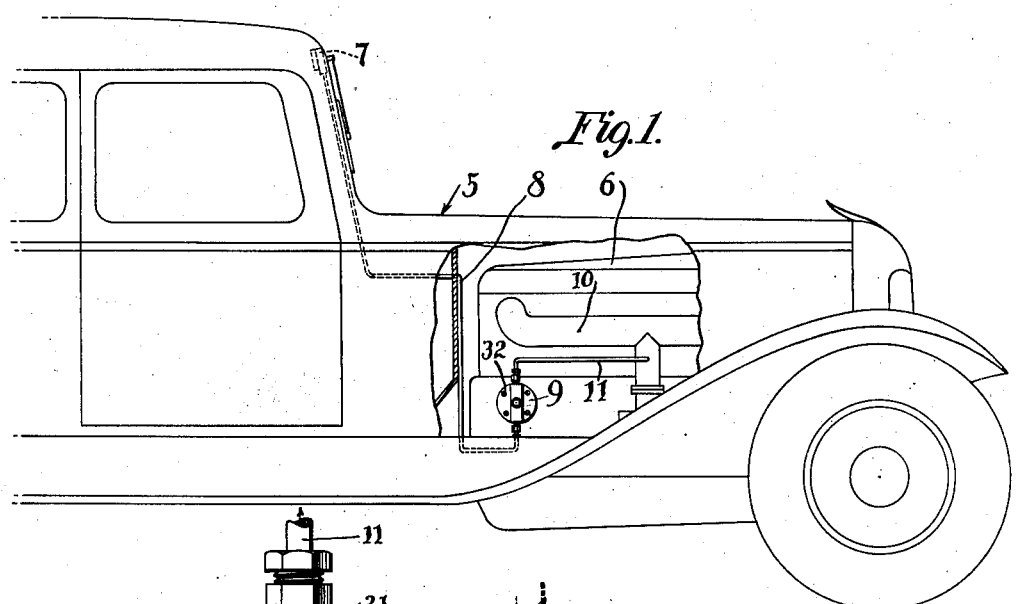
Fig. 1 represents an automotive vehicle showing the pump included in the suction line from the intake manifold of the vehicle engine to an automotive accessory operable by differential pressure.

Referring more particularly to the drawing, an automotive vehicle is indicated generally at 5, equipped with an internal combustion engine 6. The vehicle is provided with a fluid operated automotive accessory such as the windshield cleaner motor 7 which has fluid communication through the conduit 8 with the instant pump indicated generally at 9. Fluid communication may also be had between the device 9 and the intake manifold 10 of the internal combustion engine through the conduit 11 whereby fluid is drawn from the atmosphere through the fluid operated motor 7, the conduit 8, the device 9 and conduit 11 into the intake manifold.

The device 9 comprises a part-time two-way fluid pressure pump herein depicted as a suction pump which is provided with a casing 20 adapted for mounting adjacent a convenient portion of the internal combustion engine, such as the crank case 21, the mounting being effected by any suitable mounting and attaching means. The casing 20 is formed with a chamber for the reception of a fluid displacing member, such as the piston 12. The piston may be formed of a pair of flexible cup members 13 and 14 which are arranged back to back on the opposite sides of a rigid central plate 15 to which the cup members are attached by means of suitable devices such as the rivets 16. The peripheral flanged portions 17 and 18 of the cups extend in opposite directions along the inner wall of the casing chamber for packing engagement therewith.

The casing is formed with a bearing 19 which extends through the side wall 21 of the crank case and supports the push rod 23 for reciprocatory movement imparted thereto by a suitable drive, such as the engine cam shaft 24. This push rod 23 is formed with an axial bore 23' for the reception of piston rod 24' attached to the piston, for instance by means of the screw 25, which also serves to hold the piston parts 13, 14, and 15 in assembled relation. A counter bore in the push rod 23 provides a shoulder 26 on which bears one end of a coiled spring 27, the other end finding support on piston unit 12. In the form shown in the drawing the spring 27 is coiled about the rod 24 in order to make an even compact structure. A fabric pad 28 is placed within the head in order to dampen and silence the impact between the push member 23 and rod 24.

The pump may have a removable face plate 29 which is secured to the flange 30 of the casing 20 as by fasteners 32, fluid tight connection being made by a gasket member 31. The face plate is provided with a well to receive a power coiled spring 33 having bearing contact at one end upon the face of piston 12 in a suitable fashion, as for instance against the cup plate 34, and at its opposite end on a shoulder 35 in the bottom of the well as defined by the screw plug 36. This spring serves to move the piston on its return stroke but is counteractable by a predetermined fluid pressure influence on the piston.

The automotive accessory is connected through the conduit 8 to the interior of the casing at opposite sides of the piston, and to this end the conduit 8 has a T 37 which in turn branches through the inlet ports 38 and 39 into the fore and aft chambers 42 and 43 into which the aforesaid casing chamber is divided by the piston. These ports are controlled by valve members 40 and 41, respectively, in permitting unidirectional flow of fluid into the fore and aft chambers of the casing. Fluid from a common source may thus enter the casing upon opposite sides of the piston 12, fluid entrance occurring upon any movement of piston 12.

The fore chamber 42 is provided with an outlet port 44 controlled by a valving member 46 to permit unidirectional flow of fluid from the casing to conduit 11 and thence to the intake manifold 10. The aft chamber 43 has its outlet port 45 controlled by a valve 45'. To avoid too great a discharge of fluid into the intake manifold one of the outlet ports may discharge to the atmosphere or into the engine crank case.

Figure 2:
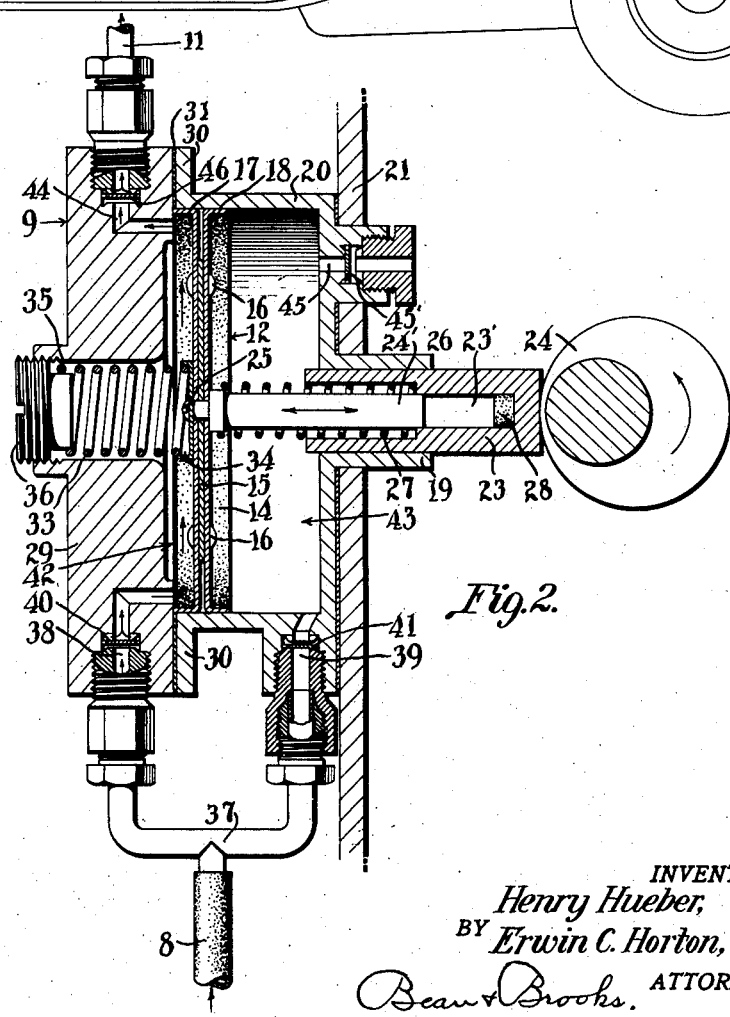
Fig. 2 represents a vertical section through the device showing the device attached adjacent to the crank case of an internal combustion engine and having operative contact with a moving part of the engine.

It is thought that the operation of the device will be understood from the foregoing, but briefly it is as follows: Under normal operating conditions of the engine sufficient low pressure or suction exists in the intake manifold to insure efficient operation of the automotive accessory. The differential pressure thus occurring in the piston chamber of the casing will cause piston 12 to move to the advanced position shown in Fig. 2, ensmalling the fore chamber 42 against the tension of the spring 33, and the valves 40 and 46 will open to permit free flow through the pump. During this interval the piston remains arrested under the influence of the pressure differential while the push rod 23 merely idles back and forth, following the cam under the action of the spring 27.

However, under those conditions of operation where a fluctuating suction exists in the intake manifold, or where the operating pressure is insufficient to operate the automotive accessory at a desirable or regular rate, the coil spring 33 moves piston 12 to ensmall the aft chamber 43 against the compression of spring 27. The reciprocation of the push member 23, under the influence of cam 24, alternately increases and decreases the compression upon spring 27, and during the compression stroke sufficient force is exerted to overcome the power of spring 33 and move the piston toward the face plate 29. During these periods of operation in which the suction is insufficient to maintain the position of the piston 25 adjacent the face plate 29, the piston is reciprocated more or less within the cylinder or casing as controlled by the degree of vacuum in the fore chamber 42. Upon release of compression of spring 27, the spring 33 will move the piston away from face plate 29 and, in cooperation with the cam 24, maintain a reciprocating action of the piston.

Therefore, during periods of maintenance of sufficient suction within the intake manifold, piston 12 remains in an inoperative position. When, however, the piston 12 is reciprocating within the casing, fluid is drawn into the casing, upon both the forward and return movements of the piston, through the valve ports 38 and 39. Thus, when the piston is moving toward the face plate, or advancing, fluid is drawn into the casing through the valve port 39, the valve member 40 being seated and exit of fluid therethrough prevented. However, upon movement of the piston in the opposite direction, fluid flows through the valve port 38 into the casing between the face of the piston and the face plate 29 while retrograde flow into T 37 is prevented by the seating of valve 41, fluid being expelled through port 45 into the crank case.

It will thus be seen that the present invention provides a part-time double acting fluid pump for use in conjunction with the operation of automotive accessories wherein it is desired to operate such an accessory at a substantially constant or regular rate, the pump remaining in an inoperative position during periods of sufficient suction maintenance within the intake manifold, and operating during those periods of insufficient manifold suction to produce steady and regular operation of the accessory. Obviously, when the accessory is shut off and the pressure in the conduit 8 is low, the pump will remain substantially inoperative regardless of any manifold connection.

While the sliding type of piston is illustrated, the term "piston" is herein used in its broadest sense and includes a diaphragm or other fluid displacing member.

What is claimed is:

1. A double acting part-time boosting pump comprising a chambered casing, a piston movable in the casing, an outlet port in the casing upon one side of the piston for connection with a source of variable pressure, an inlet port in the casing upon the same side of the piston, an outlet port in the casing upon the other side of the piston, an inlet port in the casing upon said other side of the piston, valves in said ports permitting uni-directional flow through the casing at opposite sides of the piston and adapted to automatically close against a reverse fluid flow, said inlet ports intercommunicating, resilient means for moving the piston in one direction, and other resilient means for moving the piston in the other direction in counteraction of said first resilient means and having a play connection with the piston for permitting the piston to be moved by pressure differential from the influence of said other resilient means when the source of variable pressure is of a predetermined degree.

2. A double acting part-time pump comprising a casing, a piston movable in the casing, an outlet port in the casing upon one side of the piston for connection with a source of variable pressure, an inlet port in the casing upon the same side of the piston, an outlet port upon the other side of the piston, an inlet port in the casing upon said other side of the piston, said ports having valve means for uni-directional flow of fluid through the casing at opposite sides of the piston, said valve means operating to prevent a reverse flow through the casing and being pressure operated, resilient means for urging the piston in a direction opposed to movement due to the urge of the pressure from the source acting on the first side of the piston, and resilient means intermittently urging the piston against said first resilient means when the pressure of the fluid at said source is insufficient to counteract the urge of said first resilient means on said piston.

3. A double acting part-time vacuum pump comprising a casing, a piston reciprocable therein and dividing the casing interior in fore and aft chambers, inlet and outlet ports for each chamber, one of the outlet ports being connected to a source of sub-atmospheric pressure, the other outlet port opening to the atmosphere, valves for said ports permitting uni-directional flow through each chamber and the valves in the ports of one chamber closing in the presence of fluid flow through the companion chamber independent of piston operation, resilient means urging the piston to enlarge that chamber which is connected to the source of sub-atmospheric pressure, means for driving the piston in the opposite direction, a push member operated by said drive means toward the piston, and resilient means interposed between said push member and the piston and acting in counteracting opposition to said urging means when compressed by said push member to a predetermined degree.

4. A double acting part-time pump comprising a chambered casing, a piston movable in the casing, an outlet port in the casing upon one side of the piston for connection with a source of variable pressure, an inlet port in the casing upon the same side of the piston, an outlet port in the casing upon the other side of the piston, an inlet port in the casing upon said other side of the piston, valves in said ports permitting uni-directional flow through the casing at opposite sides of the piston and adapted to automatically close against a reverse fluid flow, said inlet ports intercommunicating, resilient means for moving the piston in one direction, and drive means for moving the piston in the opposite direction in counteraction of said resilient means and having a play connection with the piston for permitting the piston to be moved by pressure differential from the influence of said drive means when the source of variable pressure is of a predetermined degree.

HENRY HUEBER.
ERWIN C. HORTON.